(12) United States Patent
Pillai et al.

(10) Patent No.: US 12,253,966 B2
(45) Date of Patent: Mar. 18, 2025

(54) PCIe DETERMINISTIC LINK TRAINING USING OOB COMMUNICATIONS AND ENUMERATION OPTIMIZATION DURING DIFFERENT POWER-UP STATES

(71) Applicant: Intel Corporation, Santa Clara, CA (US)

(72) Inventors: Prakash Pillai, Bangalore (IN); Sagar Pawar, Bangalore (IN); Raghavendra Nagaraj, Bangalore (IN); Ovais Pir, Srinigar (IN); Pannerkumar Rajagopal, Bangalore (IN)

(73) Assignee: Intel Corporation, Santa Clara, CA (US)

(*) Notice: Subject to any disclaimer, the term of this patent is extended or adjusted under 35 U.S.C. 154(b) by 665 days.

(21) Appl. No.: 17/482,786

(22) Filed: Sep. 23, 2021

(65) Prior Publication Data
US 2023/0086027 A1    Mar. 23, 2023

(51) Int. Cl.
*G06F 11/07*      (2006.01)
*G06F 9/445*      (2018.01)
*G06F 13/42*      (2006.01)

(52) U.S. Cl.
CPC .......... *G06F 13/4282* (2013.01); *G06F 9/445* (2013.01); *G06F 11/0706* (2013.01); *G06F 11/0751* (2013.01); *G06F 11/0772* (2013.01); *G06F 2213/0026* (2013.01)

(58) Field of Classification Search
CPC ............. G06F 11/0706; G06F 11/0751; G06F 11/0772
See application file for complete search history.

(56) References Cited

U.S. PATENT DOCUMENTS

| | | | |
|---|---|---|---|
| 11,809,344 B2* | 11/2023 | Jeon | G06F 13/28 |
| 11,953,974 B2* | 4/2024 | Wang | G06F 11/1441 |
| 2016/0103743 A1 | 4/2016 | Sanghi et al. | |
| 2016/0267048 A1 | 9/2016 | Pethe et al. | |

OTHER PUBLICATIONS

European Search Report and Search Opinion, EP App. No. 22190339.6, Jan. 27, 2023, 7 pages.
Office Action, EP App. No. 22190339.6, Jul. 19, 2024, 5 pages.

\* cited by examiner

*Primary Examiner* — Nadeem Iqbal
(74) *Attorney, Agent, or Firm* — NICHOLSON DE VOS WEBSTER & ELLIOTT LLP

(57) ABSTRACT

A Peripheral Component Interface Express (PCIe) card includes a circuit board, a device mounted on the circuit board, and a PCIe processor mounted on the circuit board. The PCIe processor is communicatively coupled to the device and a host processor of a host system. The PCIe processor is configured to detect a power signal on an auxiliary (AUX) power rail of the PCIe card. A periodic detection of a state of the device is performed based on detecting the power signal on the AUX power rail. A signal indicative of the state of the device is encoded for transmission to the host processor of the host system. PCIe link training is performed via a PCIe interface with the host system. The PCIe link training is initiated based on the signal indicative of the state of the device.

20 Claims, 11 Drawing Sheets

PCIe DETERMINISTIC LINK TRAINING USING OOB COMMUNICATIONS AND ENUMERATION OPTIMIZATION DURING DIFFERENT POWER-UP STATES

TECHNICAL FIELD

Embodiments pertain to improvements in computer architectures, including improvements in computer bus architectures, such as Peripheral Component Interconnect Express (PCIe) devices and PCIe protocols to enable deterministic link training using out-of-band (OOB) communications as well as enumeration optimizations during different power-up states.

BACKGROUND

PCIe is a high-speed serial computer interconnect that connects peripheral devices, such as graphics cards, network cards, and the like, to a central processing unit (CPU) of a computing device. Peripherals connected via the PCIe bus communicate by sending packets across point-to-point communication channels called links. A link may be composed of one or more PCIe lanes that are comprised of differential signaling wire pairs. Peripherals may utilize one, four, eight, twelve, sixteen, or thirty-two lanes. Performing the link training, however, may be associated with timing inefficiencies.

BRIEF DESCRIPTION OF THE DRAWINGS

In the drawings, like numerals may describe the same or similar components or features in different views. Like numerals having different letter suffixes may represent different instances of similar components. Some embodiments are illustrated by way of example, and not limitation, in the figures of the accompanying drawings in which.

DETAILED DESCRIPTION

Figure 1:
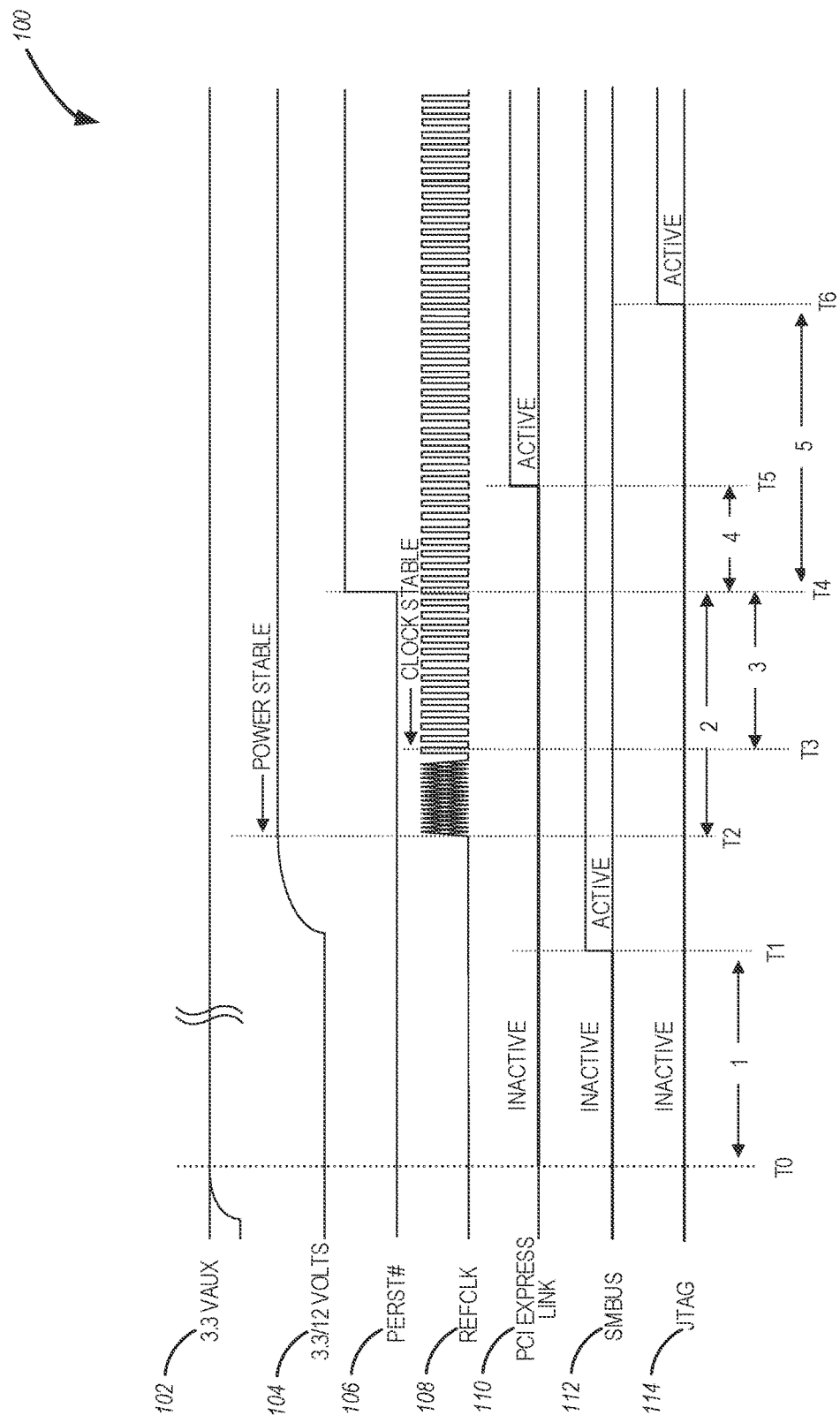
FIG. 1 is a timing diagram of PCIe configuration signals, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

As per the PCIe Card Electromechanical (CEM) specification, PCIe link training has to be initiated (e.g., duration 4 in FIG. 1) within 20 ms of the PCIe Reset (PERST_N) signal being de-asserted. As the capabilities of system-on-a-chip (SOC) devices on the PCIe cards are increasing (e.g., artificial intelligence (AI) and compute-intensive graphics PCIe cards), the initial PCIe card power-up based on the SOC's internal boot flow may take more than 20 ms to get to a ready state for link training from the host.

In this regard, PCIe card configuration may be associated with timing constraints associated with complying with the CEM specification in the timing of G3 to L0 functional state transitions as the entire SOC will need to be brought up to comply with the PERST_N de-assertion, complete the link training, and get enumerated on to the host device (e.g., a host motherboard with a host processor). More specifically, the SOC may be still booting, while the PERST_N has been de-asserted, failing the link training. This causes the host system to be reset or rebooted until the PCIe card is enumerated and is usable by the host system.

Additional drawbacks of current techniques for PCIe configuration include violation of the PERST_N to link training timing of the CEM specification causing indeterministic behavior on link training and the G3 to L0 functional state transitions. The host system may need to continue to keep waiting until the PCIe card is powered up and configured, or wait and keep PERST_N asserted until the PCIe card SOC completes the configuration. Such inadvertent delay causes indeterministic behavior of the PCIe card and the host system and can delay the overall working state of the host system. In configuration aspects when the host system does not have any synchronous handshake with the PCIe card, the host system is not aware of what state the PCIe card is in while it is powering up. Consequently, the host system may have difficulty in assigning memory mapping resources to the PCIe card.

The disclosed techniques may be used to address the above inefficiency during the PCIe card configuration. More specifically, the disclosed techniques may configure the PCIe processor (e.g., a field-programmable gate array (FPGA) or another type of micro-controller) to monitor the state (or status) of the PCIe SOC device (e.g., initial powering up and firmware loading of the SOC). The state information may be obtained periodically, may be stored in a local register, and communicated to the host processor via OOB communication (e.g., using a system management bus SMBus)). The host processor can monitor the received SOC device state information and determine when the SOC device is ready (e.g., has completed the firmware loading) and then release the PERST_N signal appropriately to initiate link training and completing the G3 to L0 functional state transitions. The disclosed techniques may be used to bring up the SOC on a PCIe card using PCIe processor-based monitoring and control, as well as the OOB communication, to convey additional key information about the card power-up and configuration statuses providing a handshake between the PCIe card and the host system. Additionally, the disclosed techniques may be used for PCI enumeration optimization (e.g., on a host system) to further improve the efficiency of a boot sequence)

The PCIe CEM specification (e.g., version 2.2.1) provides tight timing constraints (e.g., as illustrated in FIG. 1) to bring up a PCIe card within a specific duration. FIG. 1 is a timing diagram 100 of PCIe configuration signals, in accordance with some embodiments. Referring to FIG. 1, an auxiliary (AUX) power signal 102 (e.g., 3.3V) is asserted by the host system at time T0. A power signal 104 (e.g., 3.3V and 12V power rail) is asserted for powering a PCIe card and becomes stable at time T2. The PERST_N signal 106 is held active low and is de-asserted at time T4. A reference clock (REFCLK) signal 108 is initiated at time T2 and becomes stable at time T3. A PCIe link training signal 110 is activated at time T5. The SMBus 112 becomes active at time T1, and the JTAG interface 114 becomes active at time T6.

The PCIe CEM specification further provides the following timing durations associated with configuring a PCIe card. Duration 1 is configured for activating the SMBus 112 after time T0. Duration 2 is the minimum duration from time T2 when the power rail of the PCIe card becomes stable to time T4 when the PERST_N signal 106 is de-asserted. Duration 3 is the minimum duration from time T3 when the REFCLK signal 108 becomes stable to de-asserting the PERST_N signal 106. Duration 4 is the minimum duration from de-asserting the PERST_N signal 106 till the PCIe link training signal 110 is activated. Duration 5 is the minimum duration from de-asserting the PERST_N signal 106 to activating the JTAG interface 114. In some aspects, a host system may wait for duration 4 (e.g., 20 ms) to initiate link training. In this regard, the G3 to L0 functional transitions may need to occur deterministically for the card's enumeration to complete and the host system maps the cards functionally accordingly in the host system's memory map.

For compute-intensive SOC's, bringing up the PCIe card including the SOC may violate PERST_N to link training timing (e.g., duration 4) and can potentially miss PERST_N de-assertion and subsequent link training requests. This timing inefficiency may cause the PCIe link to fail, causing the host to keep asserting and de-asserting the PERST_N signal, and re-initiating the training sequence after waiting for some time that is not deterministic. Since there is no "card to host" communication that happens on the current state of the card, the host will not know how much longer to wait again before initiating the link training process.

Figure 2:
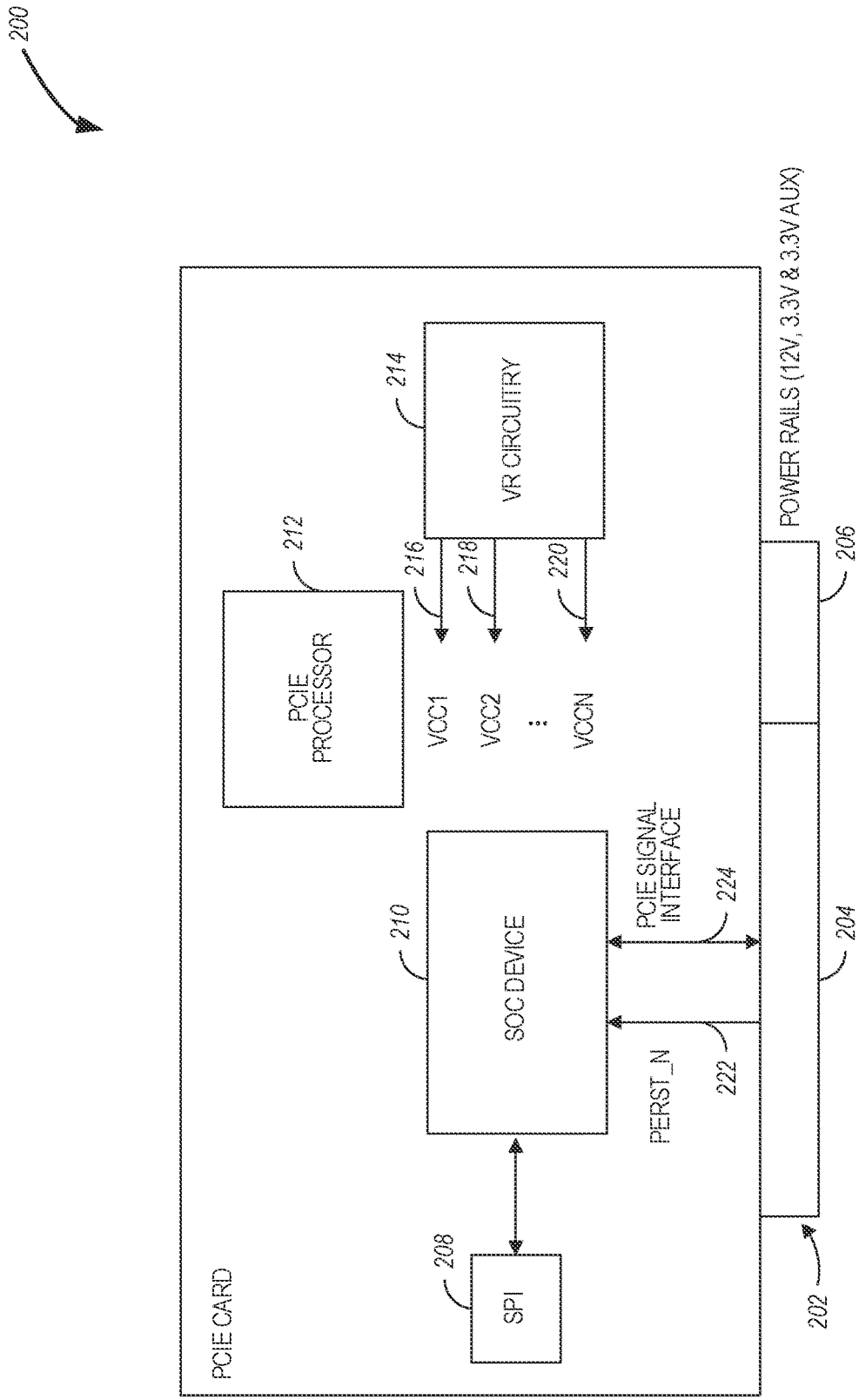
FIG. 2 is a block diagram of an example PCIe card, in accordance with some embodiments.

FIG. 2 is a block diagram of an example PCIe card, in accordance with some embodiments. Referring to FIG. 2, the PCIe card 200 may comprise a connector 202, a serial peripheral interface (SPI) 208, a SOC device 210, a PCIe processor 212, and a voltage regulator (VR) circuitry 214. The connector 202 includes power rail pins 206 and signal pins 204. The signal pins 204 may be used in connection with communicating signals (e.g., the PERST_N signal 222) between the host system (not illustrated in FIG. 2) and the SOC device 210 (e.g., via the PCIe signal interface 224). The VR circuitry 214 is configured to generate voltage signals Vcc1 216, Vcc2 218, . . . , VccN 220 that may be used by one or more circuits within the PCIe card 200 for powering different power levels.

In some aspects, the PCIe processor 212 functions as the PCIe card 200 management unit. The data path used by the SOC device 210 is via the PCIe connector 202 and may follow the PCIe CEM specification. The SPI 208 may be used for providing firmware for SOC configuration.

The PCIe card 200 may be powered by 12V, 3.3V, and 3.3V Aux power rails (e.g., using power rail pins 206). The 12V and 3.3V may be used to generate all SOC device 210 power rails, and the 3.3V Aux power rail may be used as an "always" rail to power key management function on the PCIe processor 212.

When the host system comes up, it provides power to the PCIe card 200 via the 12V/3.3V/3.3V_Aux power rails and the power rail pins 206. The VR circuitry 214 may receive these power rails as input and starts generating SOC power rails (shown as Vcc1, Vcc2, . . . , VccN) as needed to bring up the SOC device 210. Once the power sequencing is complete, the device firmware (FW) may be loaded from the SPI 208.

The time taken to configure the SOC device 210 may be directly proportional to the capabilities of the SOC device. For compute-intensive SOC devices with large cores and functions, the FW required to load in the SOC will be large as compared to standard PCIe add-in cards. While the PCIe card 200 is powering up and the SOC device is getting configured, the host processor is not aware of what state the PCIe card 200 is in as no handshake happens between them. In this regard, the host processor may issue the PERST_N signal and start to link train the PCIe card 200 while the card is still under a pre-processing state, without being configured and ready for link training. If the host processor initiates link training while the PCIe card is still being configured (e.g., while the FW is still loading), this will cause a card link failure and the host processor will have to stop the training sequence, wait, and then restart based on a fixed or assumed timing duration. This PCIe card configuration, therefore, is not deterministic and is a scalable solution for the host systems in a data center.

Figure 3:
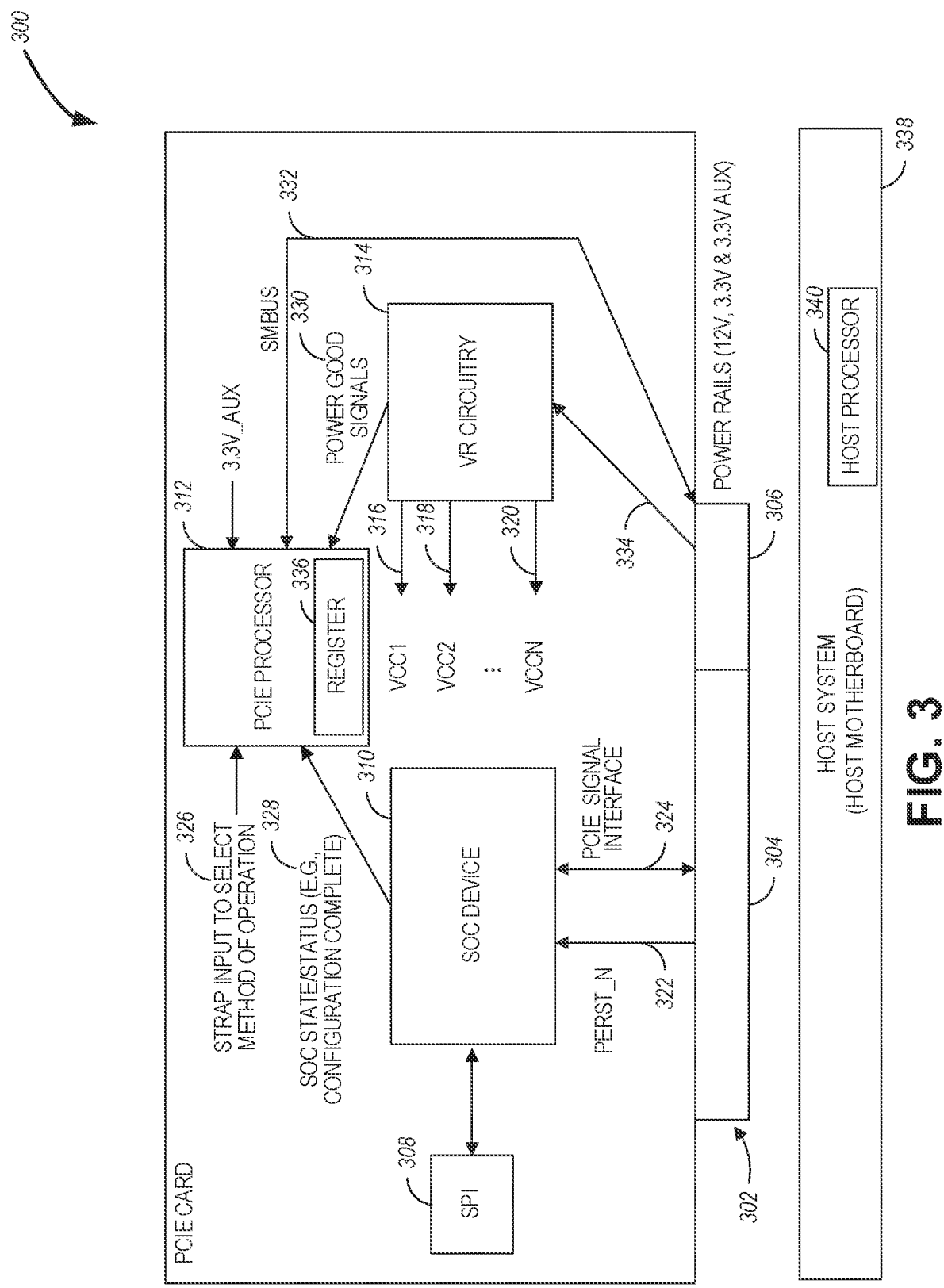
FIG. 3 is a block diagram of an example PCIe interface card using device state update for triggering PCIe link training, in accordance with some embodiments.

The disclosed techniques may be used in connection with the PCIe card 300 of FIG. 3. FIG. 3 is a block diagram of an example PCIe interface card 300 using device state update for triggering PCIe link training, in accordance with some embodiments. Referring to FIG. 3, the PCIe card 300 may comprise a connector 302 coupled to a host system 338, an SPI 308, a SOC device 310, a PCIe processor 312, and VR circuitry 314. The connector 302 includes power rail pins 306 and signal pins 304. The signal pins 304 may be used in connection with communicating signals (e.g., the PERST_N signal 322) between the host system 338 and the SOC device 310 (e.g., via the PCIe signal interface 324). The VR circuitry 314 is configured to use a power signal 334 (e.g., received from the host system 338 via the power rail pins 306) and generate voltage signals Vcc1 316, Vcc2 318, ..., VccN 320 that may be used by one or more circuits within the PCIe card 300 for powering different power levels.

The PCIe card 300 may be powered by 12V, 3.3V, and 3.3V Aux power rails (e.g., using power rail pins 306). The 12V and 3.3V may be used to generate all SOC device 310 power rails, and the 3.3V Aux power rail may be used as an "always" rail to power key management function on the PCIe processor 312.

In some embodiments, the PCIe processor 312 may periodically detect state (or status) 328 of the SOC device 310. Example state may include power status, FW loading status, configuration complete status, etc. As the host system 338 is powered up, the PCIe card power rail pins 306 will receive 12V, 3.3V, and 3.3V_Aux power. The PCIe processor 312 may be configured on the Aux rail and, hence, may also detect (or retrieve) state (or status) signals 330 (also referred to as power good signals) indicative of the status of the voltage signals 316, ..., 320 generated by the VR circuitry 314. In some aspects, the power good signals 330 are also indicative of the VR circuitry status and what stage of power sequencing the VR circuitry is in.

In some embodiments, the state information (e.g., 328 and 330) may be logged into (or stored) in a register 336 inside the PCIe processor 312. The state information (e.g., as stored in the register 336) may be communicated periodically (or continuously) via an OOB interface 332 to the host processor 340 (or a power management system managed by the host processor 340) in the host system 338. In some embodiments, the OOB interface 332 is a system management bus (SMBus). In this regard, the host processor 340 (and other circuitry of the host system 338) will be aware of the state of the SOC device 310 and the VR circuitry 314 states (e.g., what stage in the power sequencing the SOC device is at), and hence will wait for PERST_N signal 322 de-assertion and initiating link training until after SOC device 310 is configured (e.g., FW loading is complete).

As power sequencing begins for the PCIe card 300, the power good signals 330 are stored in the register 336 of the PCIe processor 312. In some embodiments, register 336 stores state information (e.g., as discussed hereinbelow) that the host can receive (via the SMBus 332) and interpret to begin the PCIe card link training and enumeration process. As the PCIe card 300 comes out of functional state G3 (e.g., as may be configured using a Link Training and Status State Machine (LTSSM)), the VR circuitry 314 on the PCIe card 300 will start powering up the SOC device rails (e.g., via power/voltage signals 316, ..., 320). The power good events for each of these respective rails are sent to the PCIe processor 312 as power good signals 330, which are stored in register 336. When a power good signal indicates activity on a corresponding power rail of the VR circuitry 314 (e.g., successful generation of a corresponding voltage signal 316, ..., 320) (or the VR circuitry in general), a status is communicated to the host processor 340 via the SMBus 332. The host processor 340, is hence, now in a state where it understands the state of the PCIe card power-up status and its progress. Once the VR circuitry 314 power rails are brought up (and voltage signals 316, ..., 320 are being successfully generated), the SOC device 310 will starts its internal configuration using FW loading via the SPI 308. A status signal (e.g., SOC configuration complete signal) 328 is sent out to the PCIe processor 312 once the SOC device 310 is done with its internal setup and FW loading.

Once the power-up process on the PCIe card 300 is completed and the SOC device 310 is configured, the PCIe processor 312 will send out a power-up complete status (e.g., when the power good signals 330 indicate all voltage signals 316, ..., 320 are being successfully generated) and the SOC device configuration complete status (e.g., when the SOC status signal 328 indicates the FW loading on the SOC device is completed successfully). The host processor 340 will now de-assert the PERST_N signal 322 and initiates (and completes) link training (e.g., via the PCIe signal interface 324). This processing using the disclosed techniques will be deterministic as the host processor 340 is aware of PCIe card 300 status information (e.g., the host processor 340 is aware of when to begin PERST_N signal 322 de-assertion, thereby removing link training timing issues). In this regard, the disclosed techniques use a dynamic handshake between the host processor 340 in the host system 338 and the PCIe card 300 circuitry that establishes details of relevant state information associated with the state/status that the PCIe card circuitry (e.g., SOC device 310 and VR circuitry 314) is currently in.

An advantage of using the disclosed techniques by the PCIe card 300 is that the power-down sequence is not impacted. Additional advantages of the disclosed techniques include bringing deterministic behavior for compute-intensive PCIe add-in card subsystems (e.g., graphics or AI-based PCIe cards) and allowing scalability on host systems across data center platforms.

Figure 4:
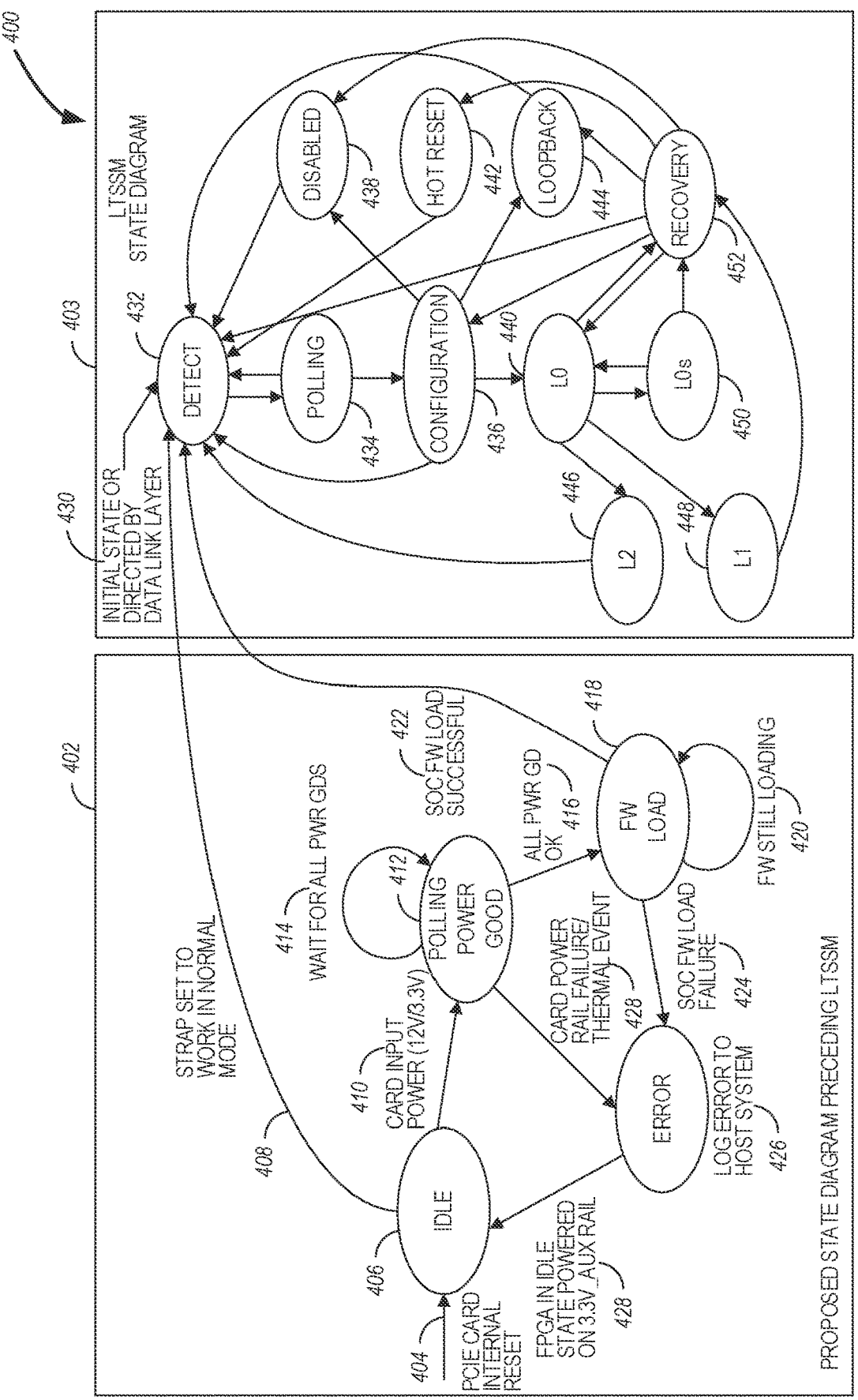
FIG. 4 illustrates an example state diagram associated with the PCIe interface card of FIG. 3, in accordance with some embodiments.

In some embodiments, whether a PCIe card 300 implements the disclosed techniques or not can be configured via strap input 326, which can be used for selecting the method of operation (e.g., operate solely using the LTSSM state diagram 403, or using state diagram 402, associated with the disclosed techniques, in addition to the LTSSM state diagram 403, as illustrated in FIG. 4). Based on the strap input 326 (e.g., a switch, a jumper, or a resistor input), the PCIe card 300 directly goes into the conventional state working model (e.g., using only LTSSM state diagram 403) or can go into the handshake model associated with the disclosed techniques (using state diagram 402 and LTSSM state diagram 403). In some aspects, the strap input 326 may be configurable or programmable.

In some embodiments, register 336 may be configured as a 32-bit register (or another size register) inside the PCIe processor 312. Example register bits D0-D31 of a 32-bit register 336 can be configured to store the following information:

(a) D0-D7: SOC power rails power good (PWR_GOOD or PWR GD) events (e.g., the status of any of Vcc1, ..., VccN);
(b) D8: VR circuitry failure (VR is down, not able to be brought up);
(c) D9: VP, circuitry is fully functional, up and running;
(d) D10: PERST_N signal is asserted/D asserted from the host processor, event log;
(e) D11: SOC configuration complete (FW loaded and SOC is up and functional);
(f) D12: Host processor and PCIe add-in card handshake complete, post link training success;
(g) D13: force link training from the host processor (link integrity issues, CRC issues, etc.);
(h) D14: card failure due to thermal event (e.g., a thermtrip_n event);
(i) D15: Host-toPCIe card in-band reset signal;
(j) D16: strap setting for the card to follow LTSSM state diagram and power-up sequence or use the disclosed techniques as well; and
(k) D17-D31: Reserved (RSVD) bits for future use.

FIG. 4 illustrates an example state diagram 400 associated with the PCIe interface card of FIG. 3, in accordance with some embodiments. Referring to FIG. 4, state diagram 400 includes the LTSSM state diagram 403 and state diagram 402 (which is associated with the disclosed techniques and can be activated and used via the strap input 326).

In aspects when only the LTSSM state diagram 403 is used, processing flow will set up the PCIe card to directly operate using the LTSSM upon detection of power input to the PCIe card.

When the PCIe card powers up (e.g., 3.3V Aux is available through the power rail pins 306), the PCIe card internal reset signal 404 is asserted and the card transitions to an idle state 406. If the strap input 326 is set to conventional/normal operation, processing transitions at operation 408 to the LTSSM state diagram 403 and the detect state 432. When card input power is detected at 410, operation transitions to polling power good states 412. At 414, the PCIe processor 312 waits for all power good signals 330 to be received. If a PCIe card power rail failure or a thermal event 428 is detected, error 426 is logged and communicated to the host system (e.g., via the SMBus 332). At 428, the PCIe processor may then transition to the idle state 406. If the power good signals 330 are successfully received, at operation 416, the state transitions to FW load state 418 when FW loading for the SOC device is initiated. FW loading may be performed at operation 420. If the FW loading is successful, at operation 422, processing transitions to the detect state 432 in the LTSSM state diagram 403 is not successful and there is an FW load failure 424, error 426 is logged and communicated to the host system again.

The detect state 432 of the LTSSM state diagram 403 may be activated based on the strap input 326 and via operation 408 or the initial state 430 (e.g., as directed by a data link layer). The LTSSM state diagram 403 further includes the following states illustrated in FIG. 4: a polling state 434, a configuration state 436, a disabled state 438, a hot reset state 442, a loopback state 444, a recovery state 452, an L0 state 440, an L0s state 450, an L1 state 448, and an L2 state 446.

In some embodiments, a PCIe card 300 includes a circuit board, a SOC device 310 (also referred to as device 310) mounted on the circuit board, and a PCIe processor 312 mounted on the circuit board. The PCIe processor 312 is communicatively coupled to device 310 and a host processor 340 of a host system 338. The PCIe processor 312 is configured to detect a power signal on an auxiliary (AUX) power rail of the PCIe card 300. The PCIe processor 312 is configured to perform a periodic detection of a state of the device 310 based on detecting the power signal on the AUX power rail. The PCIe processor 312 is configured to encode a signal indicative of the state of the device for transmission to the host processor 340 of the host system 338. The PCIe processor 312 is configured to perform PCIe link training via a PCIe interface 324 with the host system. The PCIe link training is initiated based on the signal indicative of the state of the device.

In some embodiments, the PCIe card 300 further includes VR circuitry 314 mounted on the circuit board. The PCIe processor 312 is further configured to encode a polling signal for transmission to the VR circuitry 314 and decode a plurality of Power Good (PWR GD) signals 330 received from the VR circuitry 314 in response to the polling signal. The plurality of PWR GD signals 330 are associated with a corresponding plurality of voltage signals 316, . . . , 320 generated by the VR circuitry 314.

In some embodiments, the PCIe processor 312 is configured to perform firmware loading of the device, based on the plurality of PWR GD signals 330 indicating each voltage signal of the corresponding plurality of voltage signals is generated by the VR circuitry. In some aspects, the PCIe processor 312 is configured to encode the signal for transmission to the host processor 340 of the host system 338 to include an indication of successful completion of the firmware loading of the device 310.

In some embodiments, the PCIe processor 312 is configured to decode a PCIe Reset (PERST_N) signal 322 received from the host system 338, based on the indication of the successful completion of the firmware loading. The PCIe processor 312 is configured to perform the PCIe link training via the PCIe interface within a pre-configured time from decoding the PERST_N signal.

In some embodiments, the PCIe processor 312 is configured to detect a failure event associated with at least one of the following: generation of the plurality of voltage signals by the VR circuitry or performing the firmware loading of the device. In some aspects, the PCIe processor 312 is configured to store the failure event and the state of the device in register 336 of the PCIe processor. The PCIe processor 312 is configured to retrieve the failure event and the state from the register 336, and encode the signal for transmission to the host processor to be indicative of the state of the device and the failure event. In some aspects, performing the PCIe link training is delayed based on the failure event.

In some aspects, the PCIe processor is configured to encode the signal indicative of the state of the device for transmission to the host processor of the host system via an out-of-band (OOB) interface between the host system and the PCIe card. In some aspects, the OOB interface is a system management bus (SMBus) 332.

In some embodiments, the disclosed techniques further include PCIe enumeration optimization (e.g., at the host system side) during different advanced configuration and power interface (ACPI) power-up states.

In modern computing architectures, computing devices (e.g., laptops, desktops, workstation, servers, etc.) are built-in and not detachable and the resources for these devices are fixed/stationary (e.g., SATA, PCIe, NVMe, m.2 cards including Wi-Fi cards, storage, etc.). Consequently, performing PCI enumeration and allocating resources on every boot is redundant. Therefore, optimizing the PCI enumeration can save CPU cycles and considerable boot time.

During system power-up processing flows, the BIOS obtains control after the CPU is out of reset, finds the bootable media, and gives control to the Operating System (OS) kernel. BIOS is platform-dependent and since the OS kernel is platform-independent, the BIOS performs the important task of providing information about the platform to the OS. In some aspects, the BIOS role includes silicon initialization, memory initialization, PCI enumeration, resource allocation, ACPI table construction, memory mapping, preparing the system for OS boot, and handing over control to the OS kernel.

PCI enumeration is one of the important tasks which the BIOS performs, during which it scans all the available PCI bus/device/functions and allocates resources (e.g., memory-mapped input/output (MMIO), IO, interrupt, etc.) for each device. This PCI scanning may consume numerous CPU cycles and processing time. The BIOS performs the PCI enumeration activity on all power-up flows, including cold boot, warm reset, cold reset, S4 (hibernation), and S5 (off).

In some embodiments, the disclosed techniques may be used to deactivate (remove) a fixed PCI enumeration process on every boot, and use an intelligent PCI enumeration mechanism based on need, thereby saving considerable boot time and CPU cycles.

More specifically, the disclosed techniques include performing PCI enumeration and resource allocation on a first/initial boot (or after a first/initial firmware flash) and save the resulting context in storage (e.g., in BIOS NVRAM or another type of device memory or off-chip/remote memory). Every subsequent boot, the BIOS may check whether there is a need to redo the PCI enumeration scanning or not. If there is no need, the stored context from the NVRAM may be restored and the PCI enumeration and resource allocation may be skipped during the current boot. If there is a need for PCI enumeration (e.g., due to any change in a system state like a new device is hot-plugged, a device chassis is/was opened, or any corruption in the saved context), the BIOS may redo the PCI enumeration and resource allocation and store the context again on the NVRAM for subsequent boot usage.

Figure 5:
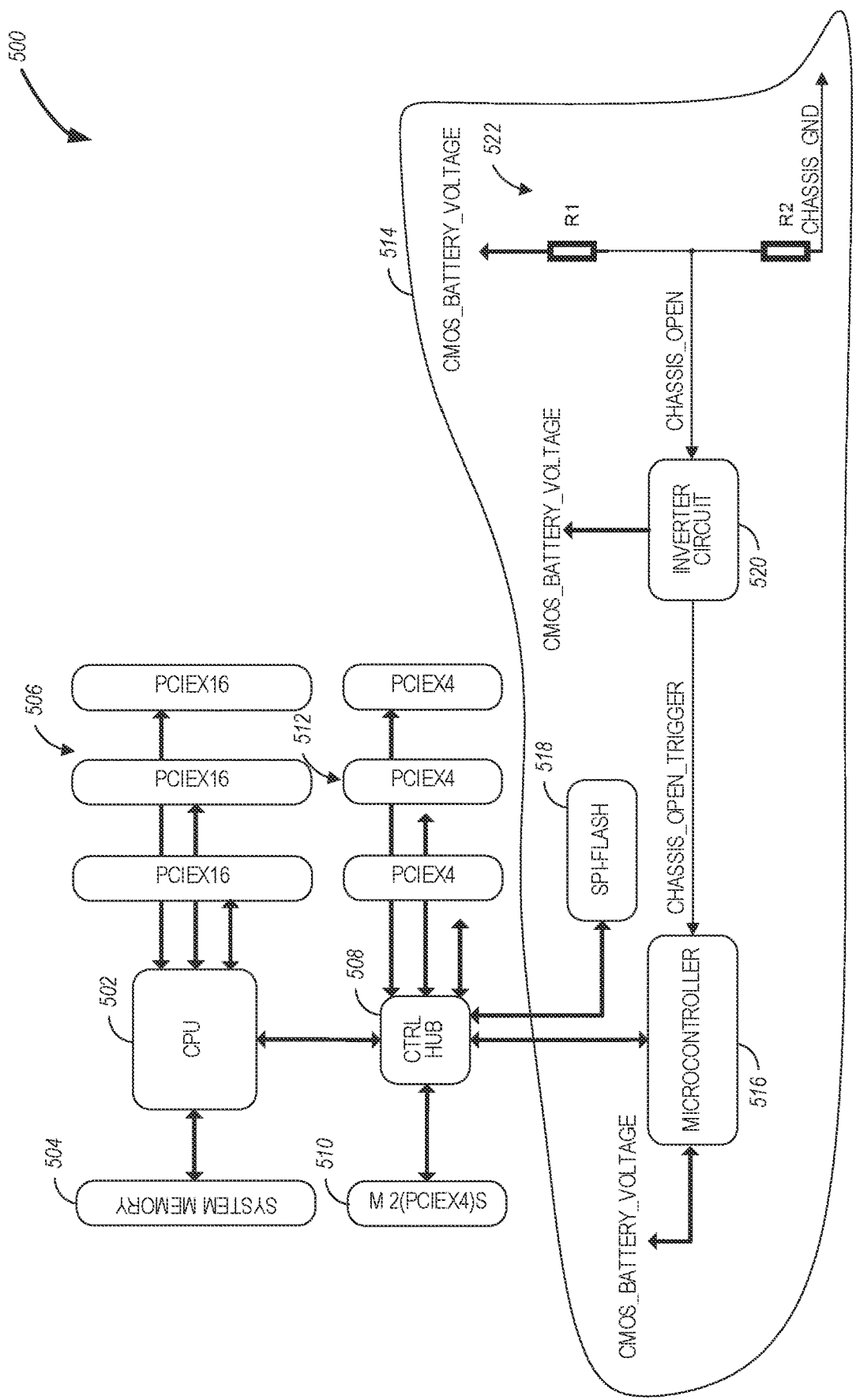
FIG. 5 is a block diagram of a computing device using techniques for PCI enumeration optimization, in accordance with some embodiments.

FIG. 5 is a block diagram of a computing device 500 using techniques for PCI enumeration optimization, in accordance with some embodiments. Referring to FIG. 5, the computing device 500 includes a CPU 502 coupled to system memory 504, a controller hub 508, and PCIe cards 506. The controller hub is coupled to communication interface 510, PCIe cards 512, and chassis monitoring circuit 514.

The chassis monitoring circuit 514 includes a microcontroller 516, memory 518, an inverter circuit 520, and resistors 522 coupled to chassis ground and battery voltage. In some embodiments, the chassis monitoring circuit 514 uses the chassis_open signal, which may be connected to the chassis ground whenever the chassis gets opened. In this regard, a chassis monitoring circuit 514 may be used for detecting a chassis_open signal in states G3 (ACPI-Mechanical off state), S5 (ACPI-Shutdown), and S4 (Hibernate) state (Powered through CMOS Battery), based on detecting a change of state (when the chassis is open) for the microcontroller 516. The detected state may be latched to take subsequent action (e.g., when the system comes back online, the microcontroller sends an interrupt to the controller hub 508 to re-enumerate all PCIe ports and perform PCI enumeration. If there is no change in the chassis open state, the boot sequence may skip performing the PCI enumeration, resulting in saving boot time and power.

Figure 6:
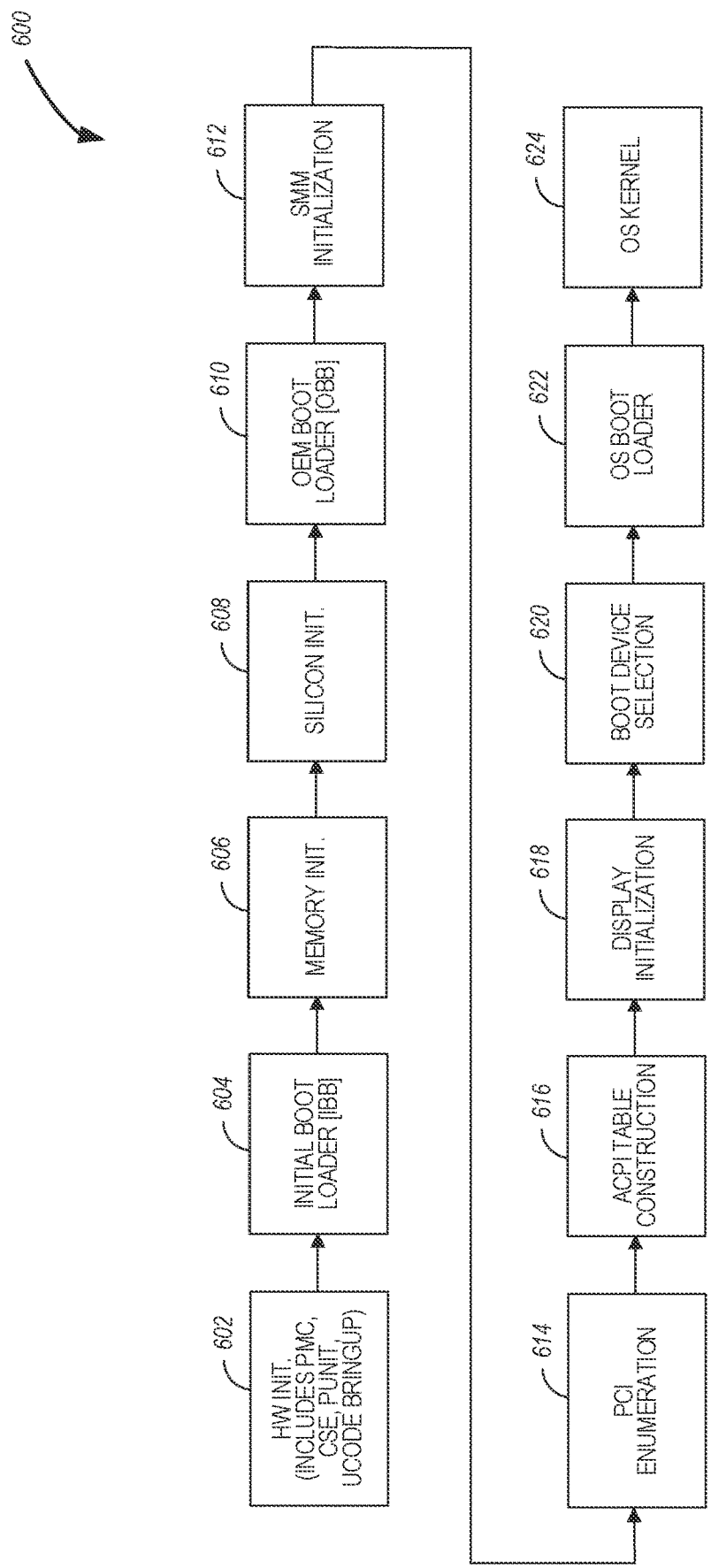
FIG. 6 is a block diagram of an example boot flow, in accordance with some embodiments.

FIG. 6 is a block diagram of an example boot flow 600, in accordance with some embodiments. Referring to FIG. 6, boot flow 600 includes hardware initialization 602, an initial boot loader (IBB) 604, a memory initialization 606, silicon initialization 608, and OEM boot loader (OBB) 610, an SMM initialization 612, a PCI enumeration 614, ACPI table construction 616, the display initialization 618, boot device selection 620, OS boot loader 622, and OS kernel execution 624.

Figure 7:
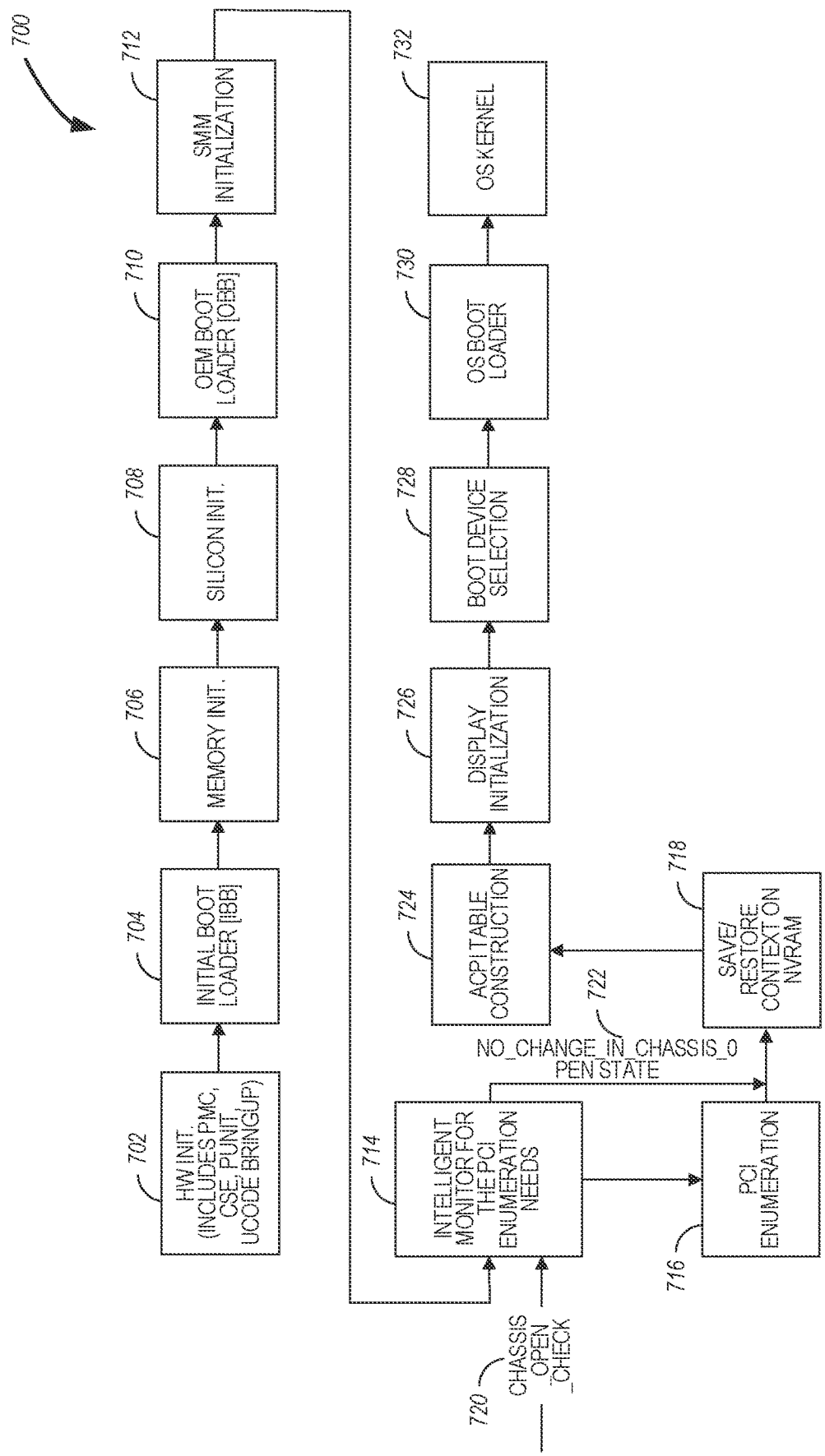
FIG. 7 is a block diagram of an example boot flow using techniques for PCI enumeration optimization, in accordance with some embodiments.

In some embodiments, the boot flow 600 of FIG. 6 may be modified using the disclosed techniques, as illustrated in FIG. 7, to optimize the PCI enumeration.

FIG. 7 is a block diagram of an example boot flow 700 using techniques for PCI enumeration optimization, in accordance with some embodiments.

During an initial/first flash or boot, the BIOS follows the regular PCI enumeration and resource allocation process (e.g., as illustrated in FIG. 6), and stores the entire context in the NVRAM. During a subsequent boot, operations 702, 704, 706, 708, 710, and 712 are initially performed. The intelligent monitor module 714 inside the BIOS checks for the need for PCI enumeration. For example, the intelligent monitor module 714 may use any of the following functionality to determine whether PCI enumeration 716 should be performed:

(a) Retrieve a status signal 722 (e.g., from memory 718) indicative of open chassis status to determine whether the device chassis was opened by the user so that there could be a potential possibility for a new device insertion or removal.
(b) Scan the device PCI hotplug GPIOs to check whether any devices are hot-plugged.
(c) Check the CMOS status bit to check whether any corruption/fault exists in memory 718.

If any of the above conditions are satisfied, the BIOS will redo the PCI enumeration 716 (and resulting resource allocation), will store the resulting context in memory 718 again, and will continue the boot with executing operations 724, 726, 728, 730, and 732. If none of the condition (a)-(c) above are satisfied, the boot process restores the context from the memory 718 (e.g., as retrieved via the status signal 722), and continue the boot sequence by executing operations 724, 726, 728, 730, and 732.

Figure 8:
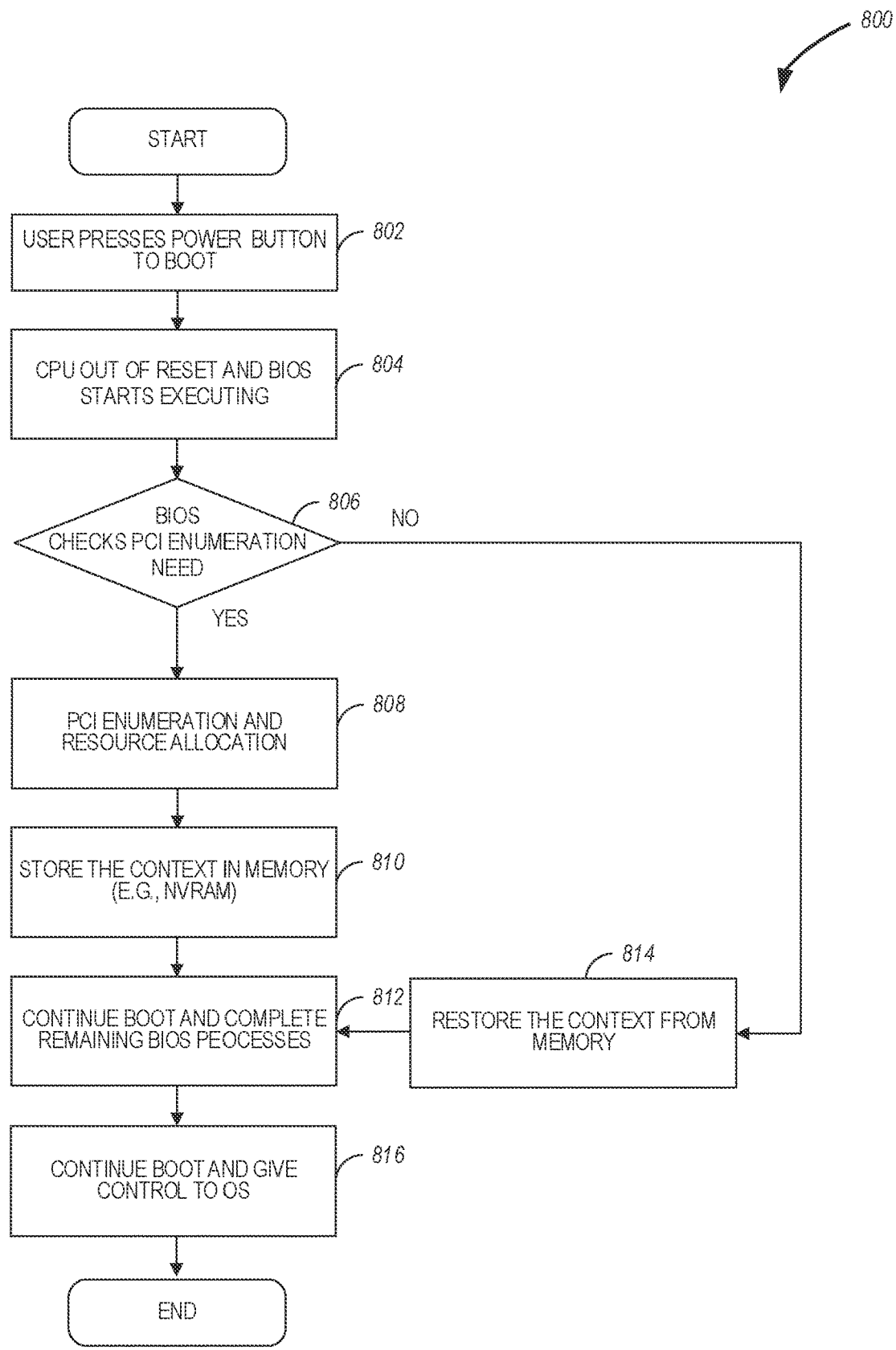
FIG. 8 illustrates a flow diagram of a method for PCI enumeration optimization during a boot sequence in a computing device, in accordance with some embodiments.

FIG. 8 illustrates a flow diagram of a method 800 for PCI enumeration optimization during a boot sequence in a computing device, in accordance with some embodiments. Referring to FIG. 8, at operation 802, a user presses a power button of a computing device to initiate a boot sequence. At operation 804, the CPU is placed out of reset and the BIOS starts executing the boot sequence. At operation 806, the BIOS checks on whether PCI enumeration is needed. If PCI enumeration is needed, processing continues at operation 808 when PCI enumeration and resource allocation is performed. At operation 810, the resulting context is stored in memory. If PCI enumeration is not needed, processing continues at operation 814 when a previously saved PCI enumeration context is restored from memory.

At operation 812, execution of the boot sequence continues and the remaining BIOS processes are completed. At operation 816, execution of the boot sequence continues and control is handed over to the OS kernel.

Figure 9:
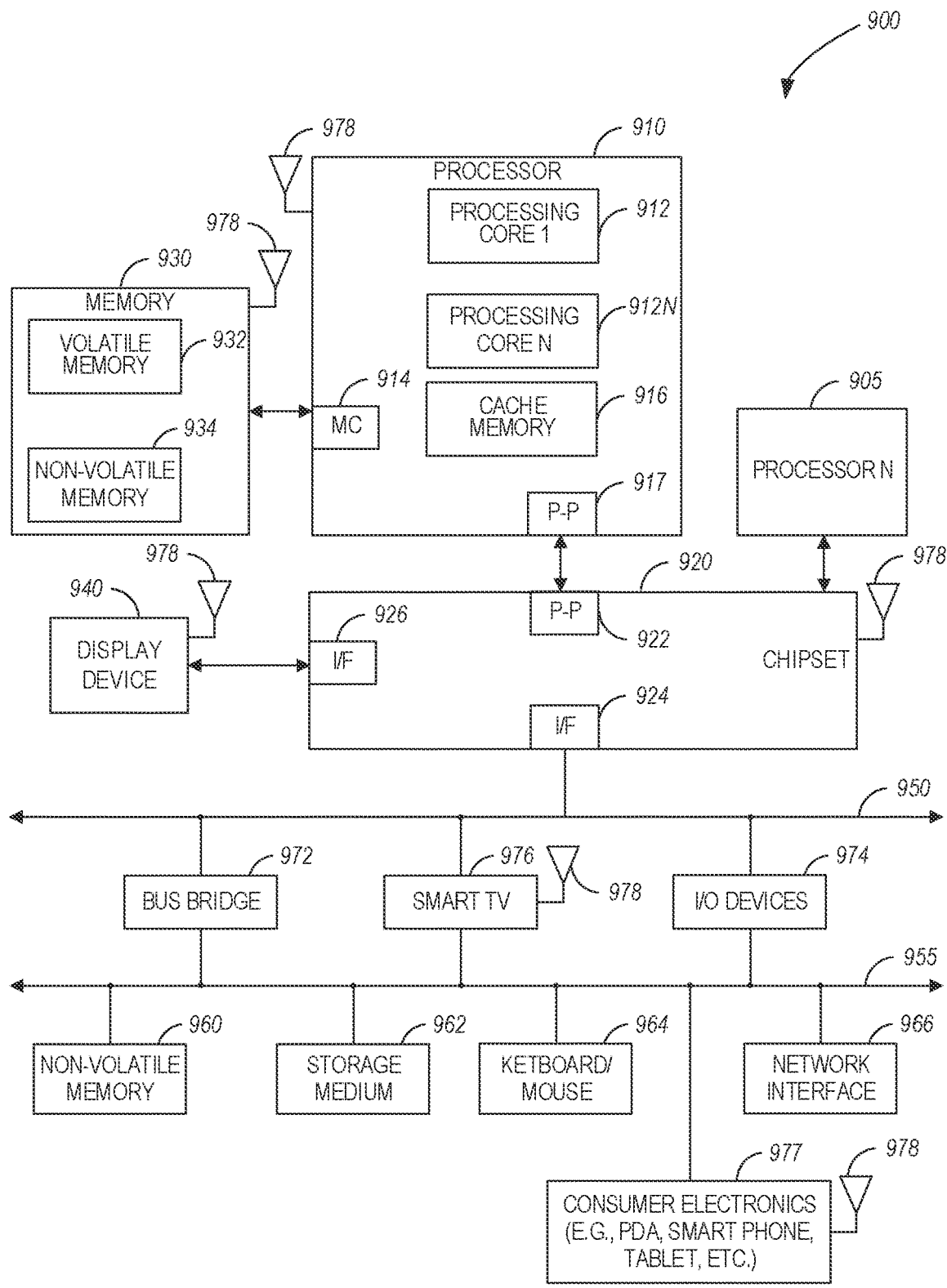
FIG. 9 illustrates a system-level diagram, depicting an example of an electronic device (e.g., a system) that can include a PCIe interface card as described in the present disclosure.

FIG. 9 illustrates a system-level diagram, depicting an example of an electronic device (e.g., a system) that can include a PCIe interface card (such as PCIe card 300) as described in the present disclosure. FIG. 9 is included to show an example of a higher-level device application for multiple device PCIe cards as discussed above. In one embodiment, system 900 includes, but is not limited to, a desktop computer, a laptop computer, a netbook, a tablet, a notebook computer, a personal digital assistant (PDA), a server, a workstation, a cellular telephone, a mobile computing device, a smartphone, an Internet appliance or any other type of computing device. In some embodiments, system 900 is a system on a chip (SOC) system.

In one embodiment, processor 910 has one or more processor cores 912 and 912N, where 912N represents the Nth processor core inside processor 910 where N is a positive integer. In one embodiment, system 900 includes multiple processors including 910 and 905, where processor 905 has logic similar or identical to the logic of processor 910. In some embodiments, processing core 912 includes, but is not limited to, pre-fetch logic to fetch instructions, decode logic to decode the instructions, execution logic to execute instructions, and the like. In some embodiments, processor 910 has a cache memory 916 to cache instructions and/or data for system 900. Cache memory 916 may be organized into a hierarchal structure including one or more levels of cache memory.

In some embodiments, processor 910 includes a memory controller 914, which is operable to perform functions that enable the processor 910 to access and communicate with memory 930 that includes a volatile memory 932 and/or a non-volatile memory 934. In some embodiments, processor 910 is coupled with memory 930 and chipset 920. Processor 910 may also be coupled to a wireless antenna 978 to communicate with any device configured to transmit and/or receive wireless signals. In one embodiment, an interface for wireless antenna 978 operates in accordance with, but is not limited to, the IEEE 802.11 standard and its related family, Home Plug AV (HPAV), Ultra-Wide Band (UWB), Bluetooth, WiMax, or any form of wireless communication protocol.

In some embodiments, volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 934 includes, but is not limited to, flash memory, phase-change memory (PCM), read-only memory (ROM), electrically erasable programmable read-only memory (EEPROM), or any other type of non-volatile memory device.

Memory 930 stores information and instructions to be executed by processor 910. In one embodiment, memory 930 may also store temporary variables or other intermediate information while processor 910 is executing instructions. In the illustrated embodiment, chipset 920 connects with processor 910 via Point-to-Point (PtP or P-P) interfaces 917 and 922. Chipset 920 enables processor 910 to connect to other elements in system 900. In some embodiments of the example system, interfaces 917 and 922 operate following a PtP communication protocol such as the Intel® QuickPath Interconnect (QPI) or the like. In other embodiments, a different interconnect may be used.

In some embodiments, chipset 920 is operable to communicate with processor 910, 905N, a display device 940, and other devices, including a bus bridge 972, a smart TV 976, I/O devices 974, nonvolatile memory 960, a storage medium (such as one or more mass storage devices) 962, a keyboard/mouse 964, a network interface 966, and various forms of consumer electronics 977 (such as a PDA, smartphone, tablet, etc.), etc. In one embodiment, chipset 920 couples with these devices through an interface 924. Chipset 920 may also be coupled to a wireless antenna 978 to communicate with any device configured to transmit and/or receive wireless signals.

Chipset 920 connects to display device 940 via interface 926. Display device 940 may be, for example, a liquid crystal display (LCD), a plasma display, cathode ray tube (CRT) display, or any other form of a visual display device. In some embodiments of the example system, processor 910 and chipset 920 are merged into a single SOC. In addition, chipset 920 connects to one or more buses 950 and 955 that interconnect various system elements, such as I/O devices 974, nonvolatile memory 960, storage medium 962, a keyboard/mouse 964, and network interface 966. Buses 950 and 955 may be interconnected together via a bus bridge 972.

In one embodiment, storage medium 962 includes, but is not limited to, a solid-state drive, a hard disk drive, a universal serial bus flash memory drive, or any other form of computer data storage medium. In one embodiment, network interface 966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra-Wide Band (UWB), Bluetooth, WiMax, or any form of wireless communication protocol.

While the modules shown in FIG. 9 are depicted as separate blocks within the system 900, the functions performed by some of these blocks may be integrated within a single semiconductor circuit or may be implemented using two or more separate integrated circuits. For example, although cache memory 916 is depicted as a separate block within processor 910, cache memory 916 (or selected aspects of 916) can be incorporated into processor core 912.

Figure 10:
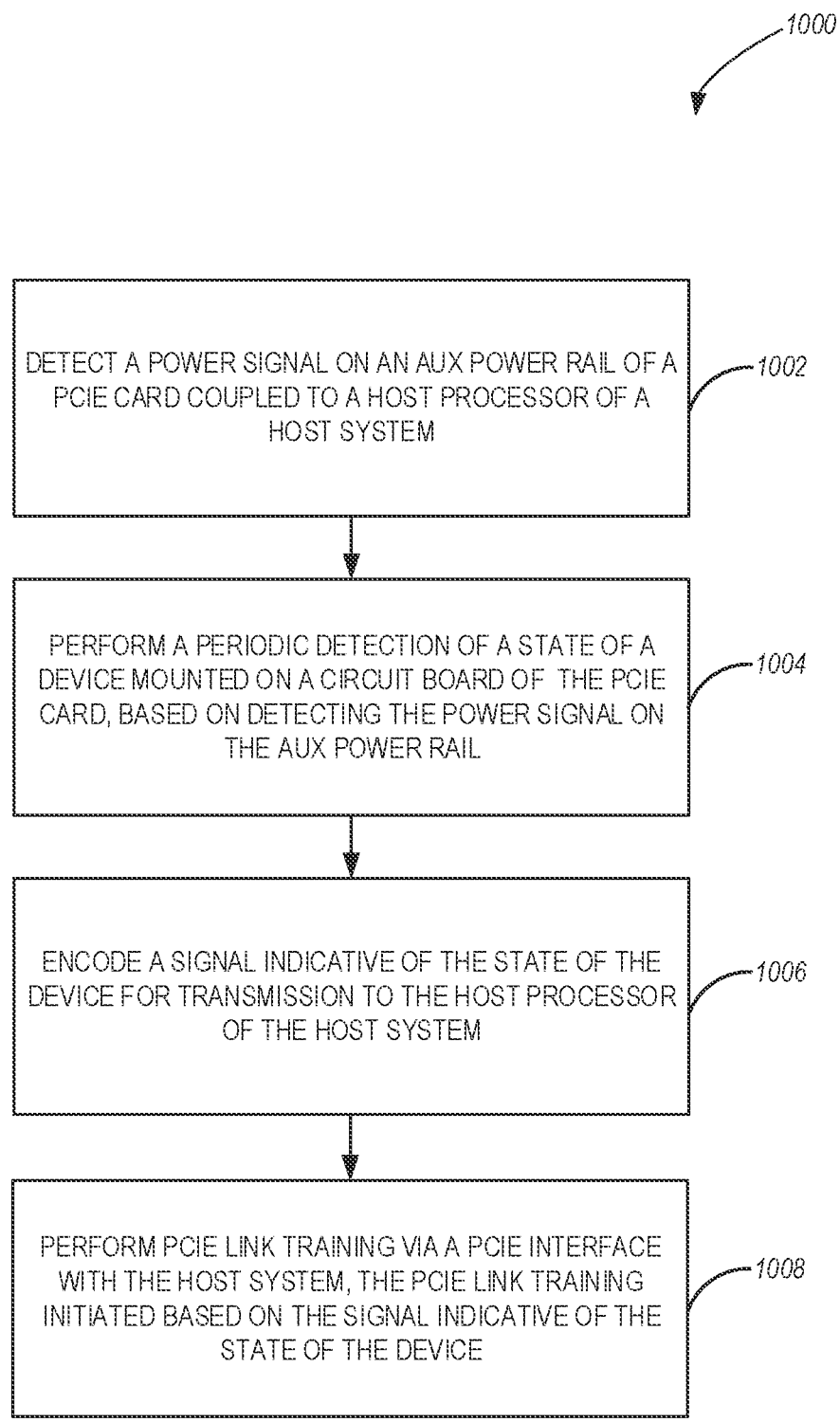
FIG. 10 illustrates a flow diagram of a method for configuring a PCIe interface card using device status updates via an out-of-band (OOB) interface, in accordance with some embodiments.

FIG. 10 illustrates a flow diagram of a method 1000 for configuring a PCIe interface card using device status updates via an out-of-band (OOB) interface, in accordance with some embodiments. Referring to FIG. 10, method 1000 includes operations 1002, 1004, 1006, and 1008, which may be executed by the PCIe processor 312 of FIG. 3.

At operation 1002, a power signal on an auxiliary (AUX) power rail of a PCIe card coupled to a host processor of a host system is detected. For example, the PCIe processor 312 detects a power signal on the AUX power rail coupled to the host system 338.

At operation 1004, a periodic detection of a state of a device mounted on a circuit board of the PCIe card is performed, based on detecting the power signal on the AUX power rail. For example, after the power signal is detected on the AUX power rail, the PCIe processor 312 may initiate periodic monitoring or periodic retrieving of state information from the SOC device 310 as well as the VR circuitry 314.

At operation 1006, a signal indicative of the state of the device is encoded for transmission to the host processor of the host system. For example, the PCIe processor 312 may periodically encode a reporting signal indicative of the state of SOC device 310 and/or VR circuitry 314 for transmission to the host processor 340 via the SMBus 332.

At operation 1008, PCIe link training is performed via a PCIe interface with the host system. For example, after the host processor 340 receives a reporting signal indicative that FW loading at the SOC device 310 is completed, PCIe link training may be initiated (e.g., by the host processor 340) and using the PCIe signal interface 324.

Figure 11:
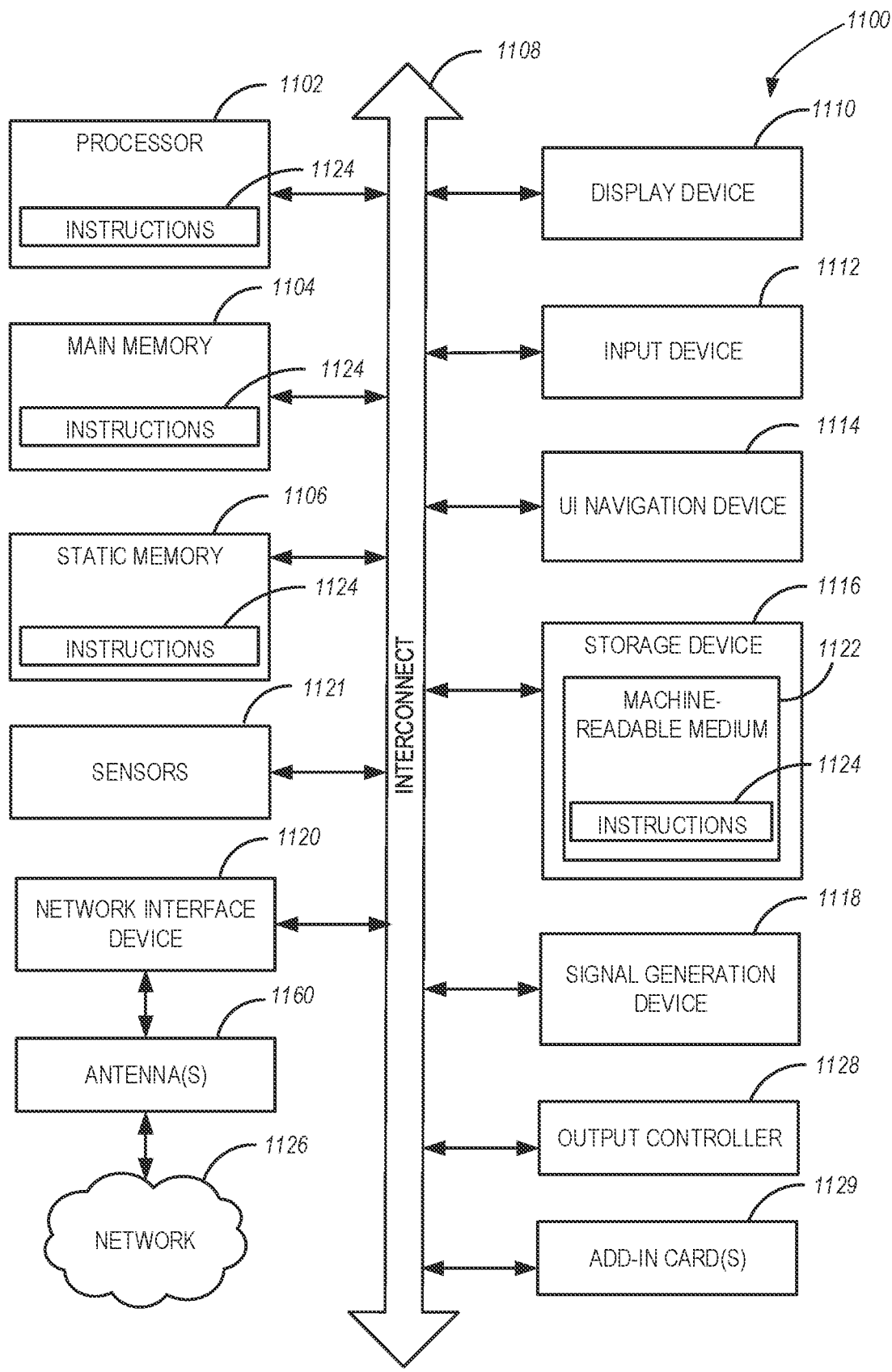
FIG. 11 illustrates a block diagram of an example machine upon which any one or more of the operations/techniques (e.g., methodologies) discussed herein may perform.

FIG. 11 illustrates a block diagram of an example machine 1100 upon which any one or more of the techniques (e.g., methodologies) discussed herein may perform. In alternative embodiments, the machine 1100 may operate as a stand-alone device or may be connected (e.g., networked) to other machines. In a networked deployment, machine 1100 may operate in the capacity of a server machine (e.g., a workstation server), a client machine, or both in server-client network environments. In an example, the machine 1100 may act as a peer machine in a peer-to-peer (P2P) (or other distributed) network environment. The machine 1100 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1100 may include a hardware processor 1102 (e.g., a central processing unit (CPU), a graphics processing unit (GPU), a hardware processor core, or any combination thereof), a main memory 1104, and a static memory 1106, some or all of which may communicate with each other via an interlink (e.g., bus) 1108.

Specific examples of main memory 1104 include Random Access Memory (RAM), and semiconductor memory devices, which may include, in some embodiments, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, input device 1112, and UI navigation device 1114 may be a touch screen display. The machine 1100 may additionally include a storage device (e.g., drive unit or another mass storage device) 1116, a signal generation device 1118 (e.g., a speaker), a network interface device 1120, and one or more sensors 1121, such as a global positioning system (GPS) sensor, compass, accelerometer, or other sensors. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 1102 and/or instructions 1124 may comprise processing circuitry and/or transceiver circuitry.

The storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 1122 is illustrated as a single medium, the term "machine-readable medium" may include a single medium or multiple media (e.g., a centralized or distributed database, and/or associated caches and servers) configured to store one or more instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, one or more sensors 1121, a network interface device 1120, antennas 1160, a display device 1110, an input device 1112, a UI navigation device 1114, a storage device 1116, instructions 1124, a signal generation device 1118, an output controller 1128, and one or more add-in cards 1129. The one or more add-in cards may include a PCIe card or another add-in card configured based on the disclosed techniques. The apparatus may be configured to perform one or more of the methods and/or operations disclosed herein. The apparatus may be intended as a component of the machine 1100 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding, or carrying instructions for execution by the machine 1100, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

Described implementations of the subject matter can include one or more features, alone or in combination as illustrated below by way of examples.

Example 1 is a Peripheral Component Interface Express (PCIe) card comprising: a circuit board; a device mounted on the circuit board; and a PCIe processor mounted on the circuit board, the PCIe processor communicatively coupled to the device and to a host processor of a host system, the PCIe processor configured to detect a power signal on an auxiliary (AUX) power rail of the PCIe card; perform a periodic detection of a state of the device based on detecting the power signal on the AUX power rail; encode a signal indicative of the state of the device for transmission to the host processor of the host system; and perform PCIe link training via a PCIe interface with the host system, the PCIe link training initiated based on the signal indicative of the state of the device.

In Example 2, the subject matter of Example 1 includes subject matter where the PCIe card further comprises voltage regulator (VR) circuitry mounted on the circuit board, and wherein the PCIe processor is configured to encode a polling signal for transmission to the VR circuitry; and decode a plurality of Power Good (PWR GD) signals received from the VR circuitry in response to the polling signal, the plurality of PWR GD signals associated with a corresponding plurality of voltage signals generated by the VR circuitry.

In Example 3, the subject matter of Example 2 includes subject matter where the PCIe processor is configured to perform firmware loading of the device, based on the plurality of PWR GD signals indicating each voltage signal of the corresponding plurality of voltage signals is generated by the VR circuitry.

In Example 4, the subject matter of Example 3 includes subject matter where the PCIe processor is configured to: encode the signal for transmission to the host processor of the host system to include an indication of successful completion of the firmware loading of the device.

In Example 5, the subject matter of Example 4 includes subject matter where the PCIe processor is configured to decode a PCIe Reset (PERST) signal received from the host system, based on the indication of the successful completion of the firmware loading; and perform the PCIe link training via the PCIe interface within a pre-configured time from decoding the PERST signal.

In Example 6, the subject matter of Examples 3-5 includes subject matter where the PCIe processor is configured to detect a failure event associated with at least one: generation of the plurality of voltage signals by the VR circuitry; and performing the firmware loading of the device.

In Example 7, the subject matter of Example 6 includes subject matter where the PCIe processor is configured to store the failure event and the state of the device in a register of the PCIe processor; retrieve the failure event and the state from the register; and encode the signal for transmission to the host processor to be indicative of the state of the device and the failure event; wherein performing the PCIe link training is delayed based on the failure event.

In Example 8, the subject matter of Examples 1-7 includes subject matter where the PCIe processor is configured to: encode the signal indicative of the state of the device for transmission to the host processor of the host system via an out-of-band (OOB) interface between the host system and the PCIe card.

In Example 9, the subject matter of Example 8 includes subject matter where the OOB interface is a system management bus (SMBus).

Example 10 is a method comprising: detecting a power signal on an auxiliary (AUX) power rail of a Peripheral Component Interface Express (PCIe) card coupled to a host processor of a host system; performing a periodic detection of a state of a device mounted on a circuit board of the PCIe card, based on detecting the power signal on the AUX power rail; encoding a signal indicative of the state of the device for transmission to the host processor of the host system; and performing PCIe link training via a PCIe interface with the host system, the PCIe link training initiated based on the signal indicative of the state of the device.

In Example 11, the subject matter of Example 10 includes, encoding a polling signal for transmission to voltage regulator (VR) circuitry mounted on the circuit board; and decoding a plurality of Power Good (PWR GD) signals received from the VR circuitry in response to the polling signal, the plurality of PWR GD signals associated with a corresponding plurality of voltage signals generated by the VR circuitry.

In Example 12, the subject matter of Example 11 includes, performing firmware loading of the device, based on the plurality of PWR GD signals indicating each voltage signal of the corresponding plurality of voltage signals is generated by the VR circuitry.

In Example 13, the subject matter of Example 12 includes, encoding the signal for transmission to the host processor of the host system to include an indication of successful completion of the firmware loading of the device.

In Example 14, the subject matter of Example 13 includes, decoding a PCIe Reset (PERST) signal received from the host system, based on the indication of the successful completion of the firmware loading; and performing the PCIe link training via the PCIe interface within a pre-configured time from decoding the PERST signal.

In Example 15, the subject matter of Examples 12-14 includes, detecting a failure event associated with at least one generation of the plurality of voltage signals by the VR circuitry; and performing the firmware loading of the device.

In Example 16, the subject matter of Example 15 includes, storing the failure event and the state of the device in a register of the PCIe card; retrieving the failure event and the state from the register; and encoding the signal for transmission to the host processor to be indicative of the state of the device and the failure event; wherein performing the PCIe link training is delayed based on the failure event.

Example 17 is a computing device comprising a host motherboard with a Peripheral Component Interface Express (PCIe) bus; a host processor mounted on the host motherboard; and a PCIe card coupled to the PCIe bus, the PCIe card comprising: a circuit board; a system-on-a-chip (SOC) device mounted on the circuit board; and a PCIe processor mounted on the circuit board, the PCIe processor communicatively coupled to the SOC device and to the host processor, the PCIe processor configured to: detect a power signal on an auxiliary (AUX) power rail of the PCIe card; perform a periodic detection of a state of the device based on detecting the power signal on the AUX power rail; encode a signal indicative of the state of the SOC device for transmission to the host processor via an out-of-band (OOB) interface between the host motherboard and the PCIe card; and perform PCIe link training via a PCIe interface with the host motherboard, the PCIe link training initiated based on the state of the SOC device.

In Example 18, the subject matter of Example 17 includes subject matter where the host processor is configured to perform a PCI enumeration during an initial boot of the computing device; store results of the PCI enumeration during the initial boot in on-chip memory of the computing device; and refrain from performing the PCI enumeration during a subsequent boot based on the results of the PCI enumeration during the initial boot.

In Example 19, the subject matter of Example 18 includes subject matter where after the initial boot, the host processor is configured to detect a fault in the on-chip memory of the computing device; and refrain from performing the PCI enumeration during the subsequent boot further based on the detected fault in the on-chip memory.

In Example 20, the subject matter of Examples 18-19 includes subject matter where after the initial boot, the host processor is configured to detect the presence of at least one peripheral device that is hot-plugged to the host motherboard; and refrain from performing the PCI enumeration during the subsequent boot further based on the detected presence of the at least one peripheral device.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Various modifications and changes may be made to disclosed aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped in a single aspect to streamline the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. A Peripheral Component Interface Express (PCIe) card comprising:
    a circuit board;
    a device mounted on the circuit board; and
    a PCIe processor mounted on the circuit board, the PCIe processor communicatively coupled to the device and a host processor of a host system, the PCIe processor configured to:
        detect a power signal on an auxiliary (AUX) power rail of the PCIe card;
        perform a periodic detection of a state of the device based on detecting the power signal on the AUX power rail;
        encode a signal indicative of the state of the device for transmission to the host processor of the host system; and
        perform PCIe link training via a PCIe interface with the host system, the PCIe link training initiated based on the signal indicative of the state of the device.

2. The PCIe card of claim 1, wherein the PCIe card further comprises voltage regulator (VR) circuitry mounted on the circuit board, and wherein the PCIe processor is configured to:
    encode a polling signal for transmission to the VR circuitry; and
    decode a plurality of Power Good (PWR GD) signals received from the VR circuitry in response to the polling signal, the plurality of PWR GD signals associated with a corresponding plurality of voltage signals generated by the VR circuitry.

3. The PCIe card of claim 2, wherein the PCIe processor is configured to:
    perform firmware loading of the device, based on the plurality of PWR GD signals indicating each voltage signal of the corresponding plurality of voltage signals is generated by the VR circuitry.

4. The PCIe card of claim 3, wherein the PCIe processor is configured to:
    encode the signal for transmission to the host processor of the host system to include an indication of successful completion of the firmware loading of the device.

5. The PCIe card of claim 4, wherein the PCIe processor is configured to:
    decode a PCIe Reset (PERST) signal received from the host system, based on the indication of the successful completion of the firmware loading; and
    perform the PCIe link training via the PCIe interface within a pre-configured time from decoding the PERST signal.

6. The PCIe card of claim 3, wherein the PCIe processor is configured to:
    detect a failure event associated with at least one of:
        generation of the plurality of voltage signals by the VR circuitry; and
        performing the firmware loading of the device.

7. The PCIe card of claim 6, wherein the PCIe processor is configured to:
    store the failure event and the state of the device in a register of the PCIe processor;
    retrieve the failure event and the state from the register; and
    encode the signal for transmission to the host processor to be indicative of the state of the device and the failure event;
    wherein performing the PCIe link training is delayed based on the failure event.

8. The PCIe card of claim 1, wherein the PCIe processor is configured to:
    encode the signal indicative of the state of the device for transmission to the host processor of the host system via an out-of-band (OOB) interface between the host system and the PCIe card.

9. The PCIe card of claim 8, wherein the OOB interface is a system management bus (SMBus).

10. A method comprising:
- detecting a power signal on an auxiliary (AUX) power rail of a Peripheral Component Interface Express (PCIe) card coupled to a host processor of a host system;
- performing a periodic detection of a state of a device mounted on a circuit board of the PCIe card, based on detecting the power signal on the AUX power rail;
- encoding a signal indicative of the state of the device for transmission to the host processor of the host system; and
- performing PCIe link training via a PCIe interface with the host system, the PCIe link training initiated based on the signal indicative of the state of the device.

11. The method of claim 10, further comprising:
- encoding a polling signal for transmission to voltage regulator (VR) circuitry mounted on the circuit board; and
- decoding a plurality of Power Good (PWR GD) signals received from the VR circuitry in response to the polling signal, the plurality of PWR GD signals associated with a corresponding plurality of voltage signals generated by the VR circuitry.

12. The method of claim 11, further comprising:
- performing firmware loading of the device, based on the plurality of PWR GD signals indicating each voltage signal of the corresponding plurality of voltage signals is generated by the VR circuitry.

13. The method of claim 12, further comprising:
- encoding the signal for transmission to the host processor of the host system to include an indication of successful completion of the firmware loading of the device.

14. The method of claim 13, further comprising:
- decoding a PCIe Reset (PERST) signal received from the host system, based on the indication of the successful completion of the firmware loading; and
- performing the PCIe link training via the PCIe interface within a pre-configured time from decoding the PERST signal.

15. The method of claim 12, further comprising:
- detecting a failure event associated with at least one of:
  - generation of the plurality of voltage signals by the VR circuitry; and
  - performing the firmware loading of the device.

16. The method of claim 15, further comprising:
- storing the failure event and the state of the device in a register of the PCIe card;
- retrieving the failure event and the state from the register; and
- encoding the signal for transmission to the host processor to be indicative of the state of the device and the failure event;
- wherein performing the PCIe link training is delayed based on the failure event.

17. A computing device comprising:
- a host motherboard with a Peripheral Component Interface Express (PCIe) bus;
- a host processor mounted on the host motherboard; and
- a PCIe card coupled to the PCIe bus, the PCIe card comprising:
  - a circuit board;
  - a system-on-a-chip (SOC) device mounted on the circuit board; and
  - a PCIe processor mounted on the circuit board, the PCIe processor communicatively coupled to the SOC device and the host processor, the PCIe processor configured to:
    - detect a power signal on an auxiliary (AUX) power rail of the PCIe card;
    - perform a periodic detection of a state of the device based on detecting the power signal on the AUX power rail;
    - encode a signal indicative of the state of the SOC device for transmission to the host processor via an out-of-band (OOB) interface between the host motherboard and the PCIe card; and
    - perform PCIe link training via a PCIe interface with the host motherboard, the PCIe link training initiated based on the state of the SOC device.

18. The computing device of claim 17, wherein the host processor is configured to:
- perform a PCI enumeration during an initial boot of the computing device;
- store results of the PCI enumeration during the initial boot in on-chip memory of the computing device; and
- refrain from performing the PCI enumeration during a subsequent boot based on the results of the PCI enumeration during the initial boot.

19. The computing device of claim 18, wherein after the initial boot, the host processor is configured to:
- detect a fault in the on-chip memory of the computing device; and
- refrain from performing the PCI enumeration during the subsequent boot further based on the detected fault in the on-chip memory.

20. The computing device of claim 18, wherein after the initial boot, the host processor is configured to:
- detect a presence of at least one peripheral device that is hot-plugged to the host motherboard; and
- refrain from performing the PCI enumeration during the subsequent boot further based on the detected presence of the at least one peripheral device.

* * * * *